(12) United States Patent
Bendel et al.

(10) Patent No.: US 11,939,805 B2
(45) Date of Patent: Mar. 26, 2024

(54) DOOR DRIVE FOR A MOTOR VEHICLE DOOR OR MOTOR VEHICLE FLAP

(71) Applicant: Kiekert AG, Heiligenhaus (DE)

(72) Inventors: Thorsten Bendel, Oberhausen (DE); Michael Berres, Cologne (DE); Bernhard Drost, Isselburg (DE); Christian Sturm, Krefeld (DE)

(73) Assignee: Kiekert AG, Heiligenhaus (DE)

( * ) Notice: Subject to any disclaimer, the term of this patent is extended or adjusted under 35 U.S.C. 154(b) by 49 days.

(21) Appl. No.: 17/785,945

(22) PCT Filed: Dec. 15, 2020

(86) PCT No.: PCT/DE2020/101064
§ 371 (c)(1),
(2) Date: Jun. 16, 2022

(87) PCT Pub. No.: WO2021/121479
PCT Pub. Date: Jun. 24, 2021

(65) Prior Publication Data
US 2023/0013256 A1    Jan. 19, 2023

(30) Foreign Application Priority Data
Dec. 18, 2019    (DE) ............... 10 2019 134 976.1

(51) Int. Cl.
*E05F 15/614*    (2015.01)
(52) U.S. Cl.
CPC ....... *E05F 15/614* (2015.01); *E05Y 2201/434* (2013.01); *E05Y 2201/716* (2013.01);
(Continued)

(58) Field of Classification Search
CPC ...... E05F 15/619; E05F 15/614; F16H 55/28; F16H 2057/0224
(Continued)

(56) References Cited

U.S. PATENT DOCUMENTS 4,407,544 A * 10/1983 Bahring ............... F16H 1/32
74/440
4,644,693 A * 2/1987 Wang ............... E05F 15/619
49/358
(Continued)

FOREIGN PATENT DOCUMENTS

| | | |
|---|---|---|
| CH | 401494 A | 10/1965 |
| DE | 1087020 B | 8/1960 |

(Continued)

OTHER PUBLICATIONS

International Search Report dated Apr. 15, 2021, for priority International Patent Application No. PCT/DE2020/101064.

*Primary Examiner* — Jake Cook
(74) *Attorney, Agent, or Firm* — Renner, Otto, Boisselle & Sklar, LLP

(57) ABSTRACT

A door drive for a motor vehicle door or motor vehicle flap, which is provided with an electromotive drive, a transmission downstream of the drive, and a force-transmission element. The force-transmission element is operatively connected to a leaf of the motor vehicle door or motor vehicle flap. An output element of the transmission and the force-transmission element are coupled by a toothing with compensation for play. According to the invention, the output element and/or the force-transmission element are not only designed to be moveable for play compensation, but can also be permanently fixed after the compensation for play.

15 Claims, 2 Drawing Sheets

(52) U.S. Cl.
CPC ... *E05Y 2201/722* (2013.01); *E05Y 2900/531* (2013.01); *E05Y 2900/546* (2013.01)

(58) Field of Classification Search
USPC .................................. 74/89.18, 89.19, 440
See application file for complete search history.

(56) References Cited

U.S. PATENT DOCUMENTS

| | | | | |
|---|---|---|---|---|
| 4,723,456 | A * | 2/1988 | Kohler | E05F 11/445 |
| | | | | 49/351 |
| 4,916,962 | A * | 4/1990 | Tsutsumi | B60N 2/2252 |
| | | | | 74/409 |
| 5,882,061 | A * | 3/1999 | Guillouet | B60N 2/43 |
| | | | | 296/68.1 |
| 6,189,399 | B1 * | 2/2001 | Frohnhaus | B60N 2/919 |
| | | | | 74/440 |
| 6,270,147 | B1 * | 8/2001 | Butler | E05F 15/619 |
| | | | | 49/140 |
| 9,487,233 | B2 * | 11/2016 | Reep | F16H 55/18 |
| 2011/0303034 | A1 * | 12/2011 | Plataret | B62D 3/123 |
| | | | | 74/409 |

FOREIGN PATENT DOCUMENTS

| | | |
|---|---|---|
| DE | 3016268 A1 | 10/1981 |
| DE | 4331384 A1 | 3/1995 |
| DE | 10114938 B4 | 10/2005 |
| DE | 102009027509 A1 | 1/2011 |
| DE | 102013206941 A1 | 10/2014 |
| DE | 102014221854 A1 | 4/2016 |
| DE | 202016102402 U1 | 8/2017 |
| DE | 102016008017 A1 | 1/2018 |
| DE | 102018218080 A1 | 4/2020 |
| EP | 1957740 A1 | 8/2008 |
| GB | 2179699 A | 3/1987 |
| JP | S596464 A | 1/1984 |
| WO | 2007/065551 A1 | 6/2007 |
| WO | 2017029163 A1 | 2/2017 |

* cited by examiner

DOOR DRIVE FOR A MOTOR VEHICLE DOOR OR MOTOR VEHICLE FLAP

This application is a national phase of International Patent Application No. PCT/DE2020/101064 filed Dec. 15, 2020, which claims priority to German Patent Application No. 10 2019 134 976.1 filed Dec. 18, 2019, each of which is hereby incorporated herein by reference in its entirety.

FIELD OF DISCLOSURE

The invention relates to a door drive for a motor vehicle door or motor vehicle flap, having an electromotive drive, a transmission downstream of the drive, and a force-transmission element which is operatively connected to a leaf of the motor vehicle door or motor vehicle flap, wherein an output element of the transmission and the force-transmission element are coupled by a toothing with compensation for play.

BACKGROUND OF DISCLOSURE

Door drives for motor vehicle doors or motor vehicle flaps are used in practice in many different ways and are described by way of example in WO 2017/029163 A1. The motor vehicle door moved in this way is typically a motor vehicle side door, for example, a motor vehicle driver door or motor vehicle passenger door. The motor vehicle flap driven by means of such a door drive is generally designed as a tailgate, luggage compartment flap, engine compartment flap, tank flap, front hood, etc.

The force-transmission element can be an adjustment part, as described in the above-referenced WO 2017/029163 A1. Other force-transmission elements are described, for example, as gears in the further prior art according to DE 43 31 384 A1. In the actuator known therefrom, a control device is provided which controls a drive motor such that the drive motor, in addition to an adjustment path, carries out a further adjustment path with each movement reversal, which corresponds to the overall mechanical play of a transmission element arrangement realized in this way. As a result, a very good setting accuracy can be provided with minimal cost and space requirements.

However, the play in this context is compensated for by the drive motor, which is also moved, in accordance with signals from the control device. Such a compensation for play is typically only noticeable at the end points of an actuating path, but it is not able to compensate for any component tolerances, wear and play associated therewith while on the actuating path. A user often notices such a play and finds it unpleasant because the motor-driven leaf of the motor vehicle door or motor vehicle flap can usually also be moved or moved further manually.

This means that the feel of door drives for motor vehicle doors or motor vehicle flaps with play in the drive train is in need of improvement. In addition, the play, viewed over the production lifespan, can increase even further, for example, due to wear and unavoidable component tolerances, and with increasing service life, it is consequently perceived as problematic by a user.

There are already other approaches for damping the movement between an output element and a drive wheel within a rotational angle play, for example, via a damping device in a load torque lock according to DE 10 2013 206 941 A1. However, the mentioned damping only takes effect with regard to the rotational angle play of the load torque lock. However, typical door drives often also operate with rack and pinion drives, so that a rotational angle play is not observed in this case.

The generic prior art according to DE 101 14 938 B4 addresses a device for actuating an automobile swinging door. For this purpose, the device has an electric motor, an output gear wheel, and a rack member. In addition, a sliding device is provided to support the rack member. For this purpose, the sliding device is arranged on the inner side and/or the outer side of the rack member and suppresses a lateral movement of the rack member.

The known actuating device according to DE 101 14 938 B4 also shows a prestressing element which is held by a holding element in order to apply the previously mentioned rack member in the direction of an output gear wheel of a transmission following the electric motor. By means of the prestressing element, a gear meshing between the rack member and the output gear wheel is thus ensured. For this purpose, the prestressing element can be designed as a coil spring or a leaf spring, or be made of rubber and press-fitted. As a result, a play compensation is made available, but it is made available by the quasi resilient prestressing element. However, fatigue of the prestressing element over longer time scales, increased wear, etc., can often not (or no longer) be compensated for in practice. This is where the invention starts from.

SUMMARY OF DISCLOSURE

The technical problem addressed by the invention is that of further developing said door drive for a motor vehicle door or motor vehicle flap such that flawless play compensation in the drive train of the leaf for the motor vehicle door or motor vehicle flap is made available in a simple and permanent manner while taking into account a robust embodiment.

This technical problem is solved by a door drive of the type in question for a motor vehicle door or motor vehicle flap, characterized within the scope of the invention in that the output element and/or the force-transmission element are not only designed to be moveable for play compensation, but can also be permanently fixed after the compensation for play.

According to the invention, in contrast to the prior art according to the generic DE 101 14 938 B4, no flexible prestressing element is used to be elastically applied to the rack member or generally to the force-transmission element. Instead, for play compensation, the invention proceeds such that the output element or the force-transmission element are initially designed to be movable relative to a base, a housing, or the leaf of the motor vehicle door or motor vehicle flap. Due to this movability, the desired compensation for play can be carried out. In order to compensate for play, the relative distance between the output element in question and the force-transmission element is advantageously changed. Alternatively or additionally, however, the radial distance between the output element and the force-transmission element can also be changed to compensate for play.

Either way, after the play compensation has been achieved in this way, the moving of the output element or the force-transmission element additionally and subsequently results in the respective, previously shifted, element to be thus permanently fixed. This can be the output element, the force-transmission element or both elements.

Due to the permanent fixing of the output element or the force-transmission element at the end of the play compensation, any fatigue of the prestressing element, as in the prior art according to DE 101 14 938 B4, expressly plays no role according to the invention because such a flexible prestressing element is, according to the invention, expressly omitted. Instead, the play compensation is typically carried out when the door drive is installed and maintained, i.e., over the entire product life cycle, after the previously moved elements have been fixed. In principle, it is of course also conceivable that a readjustment of the play or a downstream play compensation is carried out in the course of a routine inspection. As a rule, however, the play compensation is carried out and the elements are fixed only once during assembly.

There are basically two ways to approach play compensation. For example, it is conceivable that the relative distance between the output element and the force-transmission element is changed. For this purpose, a control member may be provided for the movement. This control member can be a linear adjusting drive, a wedge drive, an eccentric drive, or the like. In order to achieve a particularly compact design, the control member is generally arranged inside the output element and/or the force-transmission element.

In this case, for example, an embodiment in which the control member is designed as an eccentric drive inside the output element and/or the force-transmission element has proven to be advantageous. This eccentric drive, for example, inside the output element, may easily and without any problems ensure that, in the example case, the output element is moved inside by means of the eccentric drive in the direction of the force-transmission element or also in the opposite direction. In this case, this means that the control member is applied to an axis of the output element and/or the force-transmission element in order to change their relative distance to one another. This is usually carried out such that the two axes of the control member and the force-transmission element are aligned parallel to one another.

In the embodiment described above, the force-transmission element is typically designed as a toothed lever with internal toothing. This toothed lever usually has a curved shape or is designed in a saber-like manner, so that in this way the rotational movement of the output element corresponds to a pivoting movement of the curved toothed lever. The toothed lever is in turn operatively connected as a force-transmission element to the leaf of the motor vehicle door or motor vehicle flap. According to the invention, this refers to a mostly force-locking, sometimes also to an additional interlocking, connection. In any case, the above-described pivoting movement of the force-transmission element or of the arched or saber-like toothed lever ensures that the motor vehicle door or motor vehicle flap coupled thereto is also pivoted accordingly.

The pivoting movement achieved in this way can be a pivoting movement that takes place about an axis of the force-transmission element or the toothed lever, typically oriented in the Z direction or the vertical axis direction of the vehicle, and consequently also about an axis of the leaf of the motor vehicle door or motor vehicle flap. This, for example, is the approach in connection with a motor vehicle side door. In principle, however, the pivoting movement can also be carried out about a Y-axis or the transverse axis of the vehicle. In this case, the leaf is typically a leaf that is part of a tailgate.

In principle, the force-transmission element can be designed not only as a curved toothed lever, but also as a toothed rack. In this case, the approach is similar to the one described above. This means that the output element may again be equipped inside with the eccentric drive, the adjustment of which corresponds to the fact that the output element is changed in terms of its relative distance to the toothed rack realized in this case.

In addition to the approaches predominantly described above for play compensation in which the relative distance between the output element and the force-transmission element is changed, alternatively or additionally it is also possible according to the invention to vary the radial distance between said output element and the force-transmission element. A preferred variant in this context operates such that a movable toothed segment is provided on the output element and/or on the force-transmission element. The toothed segment is generally designed to be relatively movable and fixable relative to the statically or rigidly designed output element and/or the force-transmission element. In addition, the design is usually such that the toothed segment and the output element and/or the force-transmission element are designed to be rotatable relative to one another.

In this context, the approach is therefore usually such that the output element and also the force-transmission element regularly maintain their relative distance to one another. This means that in this case the output element and/or the force-transmission element are designed to be static or rigid. In contrast, the movable toothed segment ensures the compensation for play. For this purpose, the toothed segment is provided on the output element and/or the force-transmission element and usually connected to the respective element in a movable manner. For this purpose, the toothed segment can be guided on a bevel, or the like, of the element (output element and/or force-transmission element).

The movability of the toothed segment takes place predominantly such that, for example, the toothed segment attached to the force-transmission element can be moved relative to the force-transmission element. Since the output element is at the same time designed to be rigid and meshes with the toothed segment, the radial distance between the output element and the force-transmission element or the toothed segment mounted on the force-transmission element can be changed via the radial movability of the toothed segment when compared to the force-transmission element. In this way, the toothed segment with its tooth flanks can be brought into play-free engagement with the corresponding tooth flanks of the output element by means of a corresponding rotational movement relative to the force-transmission element, i.e., preferably in the region of drive tooth flanks bearing against one another. In general, the desired compensation for play can also be implemented in this way because, after the described process of moving the toothed segment, the toothed segment in the example case is again fixed relative to the force-transmission element. This means that in this case there is a variation in the radial distance between the output element and the force-transmission element to compensate for play, as will be explained in more detail with reference to the description of the figures.

The output element and the force-transmission element can generally be made of plastic, steel or combinations thereof. As a result, an embodiment that is not only robust but also optimized in terms of weight can be realized. Known mechanical connection techniques, for example, a screw, adhesive, clamped, or welded connection, can be used to fix the toothed segment or, in general, the output element and/or the force-transmission element.

As a result, a door drive for a motor vehicle door or motor vehicle flap is provided which is structurally simple and robust and provides effective play compensation in the drive train. This improves the overall feel. In addition, the service life is also improved because the play in the drive train is minimized from the outset. The play compensation engages between the output or between the output element and the force-transmission element which in turn is mechanically coupled to the leaf of the motor vehicle door or motor vehicle flap. This results in a particularly favorable play clearance at the output stage. This constitutes the essential advantages.

BRIEF DESCRIPTION OF DRAWINGS

The invention is explained in greater detail below with reference to drawings which show only one embodiment, in which FIG. 1 schematically shows the door drive according to the invention in a first variant.

DETAILED DESCRIPTION

Figure 1:
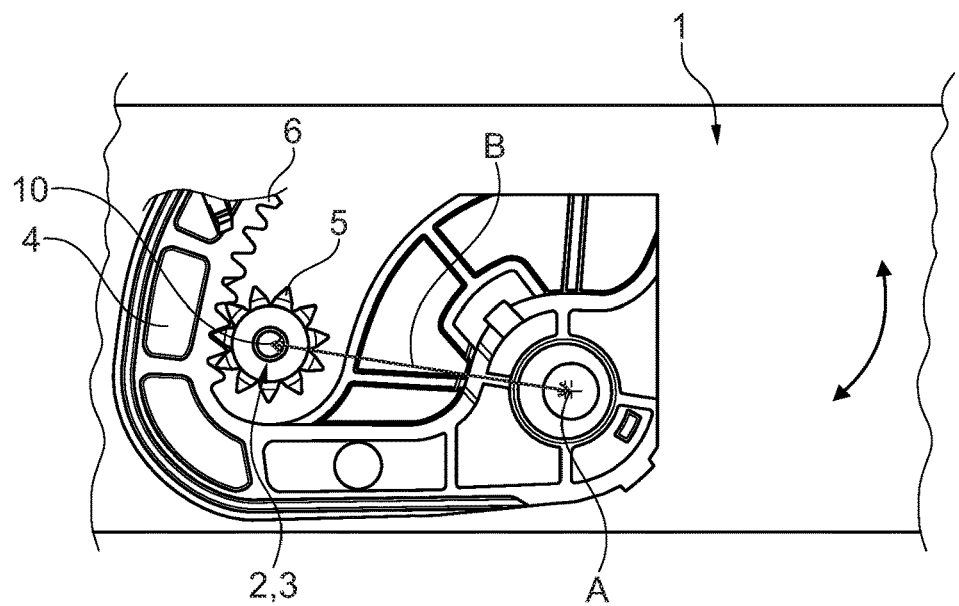

The figures show a door drive for a motor vehicle door or motor vehicle flap. An associated leaf 1 of the motor vehicle door or motor vehicle flap can be seen by way of example in FIG. 1. The door drive to be described in more detail below is arranged in the region of an axis A in order to pivot the leaf 1 and thus the motor vehicle door or motor vehicle flap, specifically in accordance with a pivoting movement about the axis A, illustrated in FIG. 1 by a double arrow.

The axis A can run in the vehicle vertical axis or Z direction if the leaf 1 belongs to a motor vehicle side door. The door drive indicated in FIG. 1 may then be arranged in the region of a front rib of the leaf 1 of the motor vehicle side door. However, it is also possible for the leaf 1 to belong to a motor vehicle flap and in particular to a motor vehicle tailgate. In this case, the axis A is oriented horizontally in the vehicle transverse or Y direction. In this case, the leaf 1 can be pivoted about the axis A by means of the door drive between a predominantly vertical orientation relative to a motor vehicle body (not shown) and a horizontal or almost horizontal orientation.

The door drive consists essentially of an electromotive drive or electric motor 2 (not shown explicitly) and a transmission 3 downstream of the electromotive drive or electric motor 2 and lastly a force-transmission element 4. In the embodiment, only an output element 3 of the transmission 3 is shown of the transmission 3 downstream of the electromotive drive 2. Any upstream gear wheels can also be present. In principle, however, the transmission 3 can also be reduced solely to the output element 3 shown. Either way, the output element 3 of the transmission 3 and the already mentioned force-transmission element 4 are coupled to one another by a toothing 5, 6. According to the embodiment, the toothing 5, 6 can be equipped with a play compensation, as will be explained in detail below.

The toothing 5, 6 is composed of a radial toothing 5 of the cylindrical output element 3 in the embodiment and an internal toothing 6 on the force-transmission element 4. In fact, according to the embodiment, the internal toothing 6 is designed in a curved or saber-like manner. As a result, rotational movements transmitted from the electromotive drive 2 to the output element 3 cause the force-transmission element 4 equipped with the internal toothing 6 to perform the pivoting movements about the axis A indicated in FIG. 1 and also in FIG. 3. The same then also applies to the leaf 1 which is operatively connected to the force-transmission element 4 and connected to the force-transmission element 4 according to the embodiment. For this purpose, the force-transmission element 4 in FIG. 1 is designed as a curved toothed lever.

The approach according to the invention for the compensation for play is such that the output element 3 and/or the force-transmission element 4 are not only designed to be movable, but can also be permanently fixed after the compensation for play. For this purpose, reference is first made to the first embodiment variant according to the individual FIGS. 2A and 2B. In both figures, the force-transmission element 4 can be seen in a schematic sectional view, specifically in the region of its axis A. In fact, a control member 7 is now provided overall for the movement or adjustment and for the compensation for play. By means of the control member 7, the force-transmission element 4 with its axis A is varied with regard to a relative distance B to the output element 3 or its axis 10.

Figure 2A:
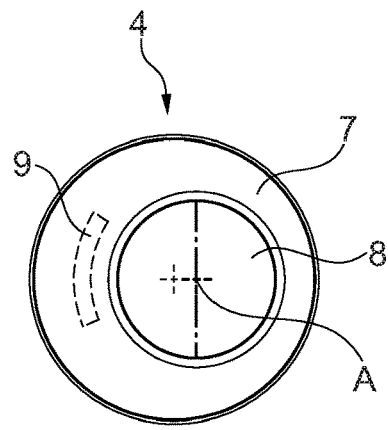
FIGS. 2A and 2B show details of the door drive according to FIG. 1.
Figure 2B:
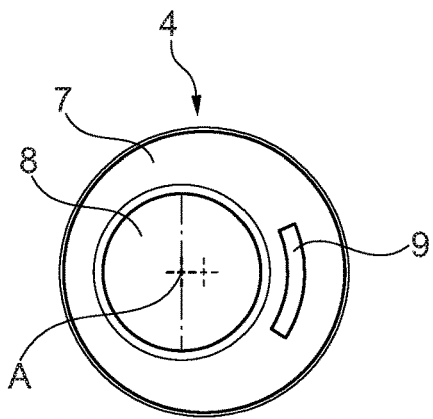

For this purpose, the control member 7 is designed as an eccentric 7 in the embodiment according to FIGS. 2A and 2B. The eccentric 7 encloses an output shaft 8, which defines the axis A, of the force-transmission element 4. In addition, a mounting opening 9 is realized in the control member or eccentric drive 7, via which the eccentric drive 7 can be adjusted.

In fact, the functional position in FIG. 2A corresponds to the force-transmission element 4 having a maximum relative distance B between the two axes 10, A in accordance with FIG. 1. In contrast, the functional position in FIG. 2B corresponds to the relative distance B between the axis A of the force-transmission element 4 and the axis 10 of the output element 3 assuming a minimum value. In this way, the play between the radial toothing 5 of the output element 3 and the internal toothing 6 of the force-transmission element 4 can be adjusted and compensated. After setting the play or after pivoting the eccentric 7 via the mounting opening 9, the force-transmission element 4 in the example case is fixed. For this purpose, a screw fixing the position of the eccentric drive 7 can engage in the mounting opening 9. It can be seen that the axis A of the force-transmission element 4 in the embodiment is acted upon in order to change the relative distance B by means of the control member or the eccentric drive 7. The two axes A, 10 run overall parallel to one another (and, according to the embodiment, perpendicular to the plane of the drawing), so that the engagement of the two toothings 5, 6 is still ensured by the play compensation carried out.

Figure 3:
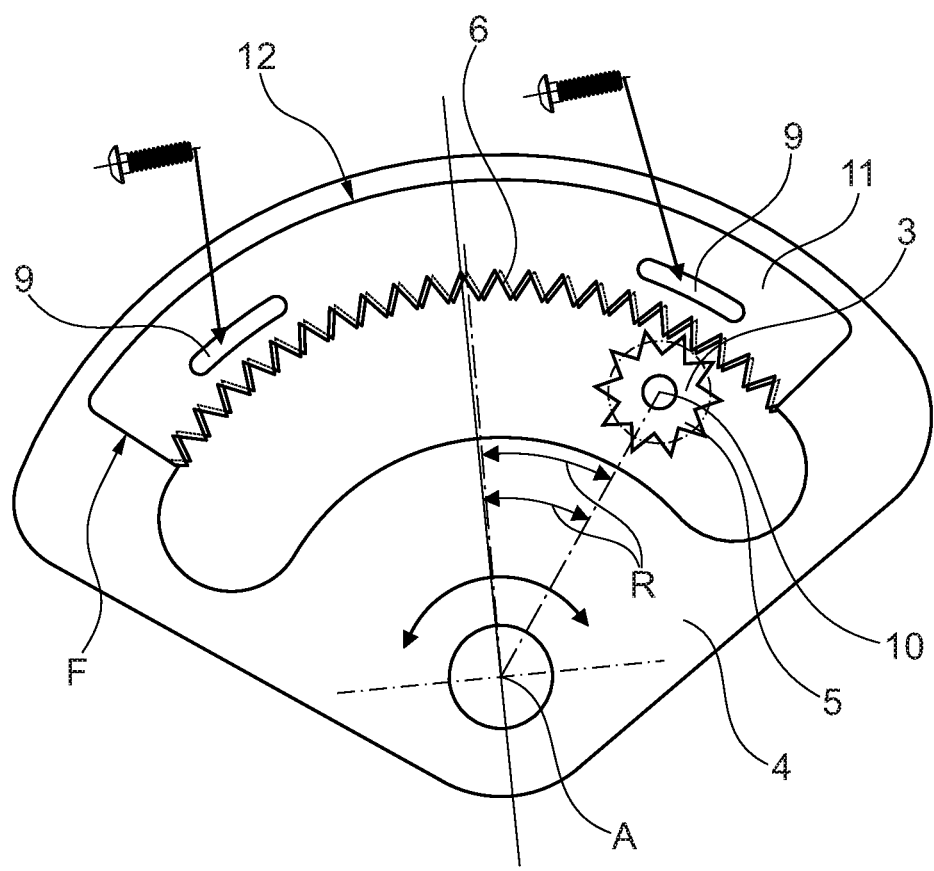
FIG. 3 shows a further, second embodiment of the invention.

In the context of the alternative embodiment according to FIG. 3, the force-transmission element 4 is again designed to be movable relative to the output element 3. For this purpose, the force-transmission element 4 is equipped with a toothed segment 11 mounted thereon, which carries the internal toothing 6 already described above. The toothed segment 11 can be moved relative to the force-transmission element 4, which is designed to be stationary in comparison thereto. By moving the toothed segment 11 relative to the force-transmission element 4 and consequently also relative to the output element 3, the required play compensation is carried out at this point. After the toothed segment 11 has been moved, it can be fixed again, namely by means of screws indicated in FIG. 3, which in this case can once again pass through mounting openings 9.

The toothed segment 11 is moved relative to the force-transmission element 4 in that a force F indicated in FIG. 3 acts on the toothed segment 11 and moves the toothed segment 11 radially relative to the force-transmission element 4. The toothed segment 11 is guided by means of a guide 12 on the force-transmission element 4.

In other words, the toothed segment 11 and the force-transmission element 4 are designed to be rotatable relative to one another. The application of the force F to the toothed segment 11 corresponds to a change of a radial distance R between the output element 3 and the force-transmission element 4 or the toothed segment 11 movably mounted on the force-transmission element 4. When looking at the embodiment according to FIG. 3, it can be seen that the application of the force F corresponds to a central axis of the toothed segment 11 proceeding from the axis A being transferred to the right to a dotdashed position.

Since the output element 3 with its axis 10 and consequently the radius vector to the axis A of the force-transmission element 4 remain stationary during this process, the application of the force F of the toothed segment 11 corresponds to the radial distance R between the output element 3 and the force-transmission element 4 or the toothed segment 11 mounted thereon being reduced, as can be retraced using FIG. 3. Conversely, an application to the toothed segment 11 in the opposite direction corresponds to the radial distance R in question being increased.

In any case, within the scope of the second embodiment according to FIG. 3, the approach is such that, for play compensation, the radial distance R between the output element 3 and the force-transmission element 4 is changed. After the play compensation has been completed, the force-transmission element and specifically the toothed segment 11 rotatably mounted thereon is fixed once again. In this case, the toothed segment 11 is guided in each case rotatably or pivotably about the axis A relative to the force-transmission element 4 by means of the depicted guide 12.

The output element 3 and the force-transmission element 4 or the toothed segment 11 can be made of plastic, steel or combinations thereof. As a result, cost-effective, lightweight and low-noise material pairings can be implemented as required. This applies in particular if the combination of steel and plastic is observed and realized.

LIST OF REFERENCE SIGNS

1 Leaf
2 Electromotive drive or electric motor
3 Transmission, output element
4 Force-transmission element
5 Radial toothing
5, 6 Toothing
6 Internal toothing
7 Control member, eccentric, eccentric drive
8 Output shaft
9 Mounting opening
10 Axis
11 Toothed segment
12 Guide
A Axis
B Relative distance
F Force
R Radial distance

The invention claimed is:

1. A door drive for a motor vehicle door or motor vehicle flap, the door drive comprising:
an electromotive drive,
a transmission downstream of the electromotive drive,
a force-transmission element which is operatively connected to a leaf of the motor vehicle door or motor vehicle flap,
wherein an output element of the transmission and the force-transmission element are coupled by a toothing with compensation for play, and wherein at least one of the output element and the force-transmission element is moveable for the compensation for play and also is permanently fixed after moving for the compensation for play, and
a control member that provides for the movement of the at least one of the output element and the force-transmission element for the compensation for play, wherein the control member is arranged inside at least one of the output element and the force-transmission element.

2. The door drive according to claim 1, wherein at least one of a radial distance and a relative distance between the output element and the force-transmission element is changed for the compensation for play.

3. The door drive according to claim 1, wherein the control member is one of a linear adjusting drive, a wedge drive, or an eccentric drive.

4. The door drive according to claim 1, wherein the control member operates on an axis of the output element and an axis of the force-transmission element for changing at least one of a relative distance and a radial distance between the output element and the force-transmission element.

5. The door drive according to claim 1, wherein the toothing comprises a movable toothed segment provided on at least one of the output element and the force-transmission element.

6. The door drive according to claim 5, wherein the toothed segment is movable and fixable relative to at least one of the output element and the force-transmission element.

7. The door drive according to claim 5, wherein the toothed segment and at least one of the output element and the force-transmission element are rotatable relative to one another.

8. The door drive according to claim 1, wherein the output element and the force-transmission element are made of plastic, steel or a combinations of plastic and steel.

9. A door drive for a motor vehicle door or motor vehicle flap, the door drive comprising:
an electromotive drive,
a transmission downstream of the electromotive drive,
a force-transmission element which is operatively connected to a leaf of the motor vehicle door or motor vehicle flap,
wherein an output element of the transmission and the force-transmission element are coupled by a toothing with compensation for play, and wherein at least one of the output element and the force-transmission element is moveable for the compensation for play and also is permanently fixed after moving for the compensation for play, and
a control member that provides for the movement of the at least one of the output element and the force-transmission element for the compensation for play, wherein the control member is an eccentric drive located inside the output element.

10. The door drive according to claim 9, wherein the toothing comprises the force transmission element being configured as a toothed lever with internal toothing.

11. The door drive according to claim 10, wherein the toothed lever with the internal toothing is curved.

12. The door drive according to claim 9, wherein the eccentric drive comprises a mounting and encloses an output shaft for the compensation for play, wherein after the compensation for play the force transmission element is fixed in the mounting.

13. The door drive according to claim 9, wherein the toothing comprises a toothed segment with the force transmission element being configured as a toothed rack, wherein the toothed segment moves relative to the force transmission element.

14. The door drive according to claim 5, wherein the tooth segment is guided by a bevel provided on at least one of the output element and the force-transmission element.

15. A door drive for a motor vehicle door or motor vehicle flap, the door drive comprising:
- an electromotive drive,
- a transmission downstream of the electromotive drive, and
- a force-transmission element which is operatively connected to a leaf of the motor vehicle door or motor vehicle flap,
- wherein an output element of the transmission and the force-transmission element are coupled by a toothing with compensation for play, and wherein at least one of the output element and the force-transmission element is moveable for the compensation for play and also is permanently fixed after moving for the compensation for play,
- wherein the toothing comprises a movable toothed segment provided on at least one of the output element and the force-transmission element, and
- wherein the toothed segment is guided by a bevel provided on at least one of the output element and the force-transmission element.

* * * * *